United States Patent [19]
Triplett

[11] 3,803,664
[45] Apr. 16, 1974

[54] WINDSHIELD CLEANER DISPENSER
[75] Inventor: Arthur L. Triplett, Auburn, Wash.
[73] Assignee: Driver's Dream, Inc., Auburn, Wash.
[22] Filed: Nov. 4, 1971
[21] Appl. No.: 195,640

[52] U.S. Cl. .......................... 15/250.03, 248/226 E
[51] Int. Cl. .............................................. B60s 1/50
[58] Field of Search....... 15/250.01, 250.03, 250.04, 15/245; 248/226 E; 24/81 CC; 222/191, 192

[56] References Cited
UNITED STATES PATENTS

| 607,248 | 7/1898 | Lane | 15/246 |
| 2,485,025 | 10/1949 | Wattles, Jr. | 15/250.03 |
| 2,535,805 | 12/1950 | McIntyre et al. | 15/250.03 |
| 3,649,987 | 3/1972 | Tomingas et al. | 15/245 |

FOREIGN PATENTS OR APPLICATIONS

| 1,430,670 | 3/1969 | Germany | 15/250.03 |

Primary Examiner—Peter Feldman
Attorney, Agent, or Firm—Christensen, O'Connor, Garrison & Havelka

[57] ABSTRACT

A refillable windshield cleaner dispenser attachable to vehicle windshield wipers and adapted to hold and dispense a dissolvable cleaning substance or the like. The device consists of a slotted capsule, a cleaning substance retained within the capsule and adapted to dissolve partially upon contact with water and run out of the slots, and means for attaching the capsule to the vehicle windshield wiper. The cleaning substance is preferably retained in solid form, the surface thereof being dissolvable gradually by rain water or the spray from automatic windshield cleaning systems.

2 Claims, 10 Drawing Figures

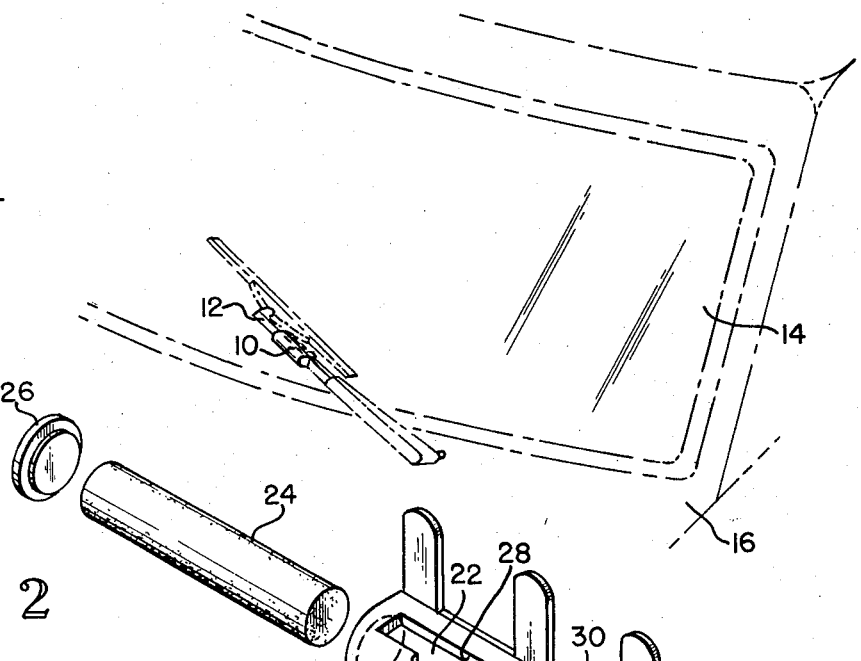
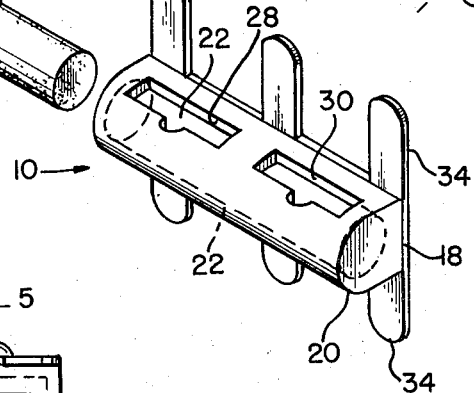
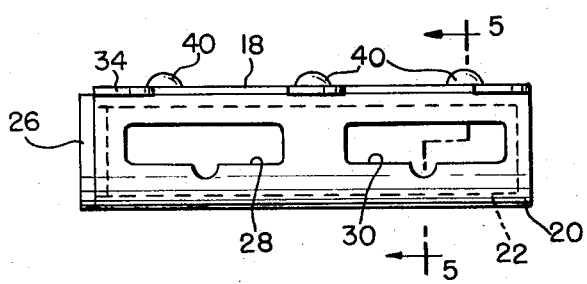
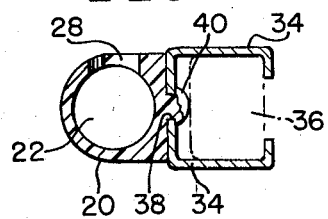
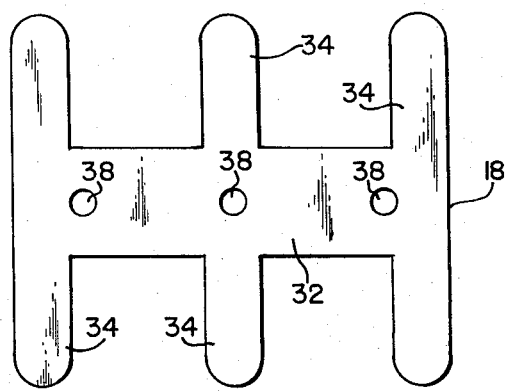
INVENTOR.
ARTHUR L. TRIPLETT
BY
ATTORNEYS

INVENTOR.
ARTHUR L. TRIPLETT

BY

ATTORNEYS

3,803,664

WINDSHIELD CLEANER DISPENSER

BACKGROUND AND SUMMARY OF THE INVENTION

An important object of this invention is to provide an inexpensive windshield cleaning substance applicator which is not subject to the complexity and maintenance difficulties of prior art driver-controlled windshield washer systems. The device provided by this invention is adapted for use on vehicles either with or without windshield washer systems.

One of the principle disadvantages of the complex prior art windshield washing systems is the necessity for the driver to interrupt his concentration on driving in order to activate the system. In heavy traffic conditions when the spray from adjacent vehicles carries oil from the roadway the driver must activate the system quite often in an attempt to eliminate the glare resulting from the oil.

This invention provides a simple means by which a small amount of cleaning substance is applied automatically to the windshield in response to the presence of water, when the windshield wipers are operating, without necessity for any additional act on the part of the driver.

The simplicity of the device reduces its cost to indeed a very small fraction of the cost of an automated windshield washer system, and the device is also usable in conjunction with such a system. It responds to the presence of water, either rain or the water from an automated windshield washer system.

Briefly, the invention provides a refillable windshield cleaning substance dispenser comprising a capsule having an internal cavity for retaining a cleaning substance and openings for entry and exit of liquid, together with means for fastening the capsule to the windshield wiper of the vehicle. The cleaning substance retained within the capsule is preferably a replaceable solid bar adapted to become liquid gradually and run slowly out of the slots upon contact with water entering the slots. The dispenser includes a removable cap for replacement of the cleaning substance.

The invention also resides in the combination with such a dispenser of a cleaning substance which comprises a solid bar of material having the quality that when wetted by water entering the slots the surface thereof dissolves partially in small amounts that run out of the capsule. Preferred ingredients include glycerin, vinegar and pumice which provide, respectively, cleaning, grease cutting and polishing functions.

Different embodiments of the invention include different means for securing the capsule to the windshield wiper. For example, metal tabs are provided in one embodiment, bendable around the windshield wiper to grip the same and hold the capsule thereon. The metal tabs are preferably a part of a one-piece metal clip secured permanently to the capsule, made of plastic.

In a second embodiment the fastening means comprise a pair of holes in one side of the capsule at each end thereof and an elongated fastening member extending through each such pair of holes. Each fastening member includes an elongated, tapered flexible tail portion and a head portion adapted to receive and grip the tail portion to prevent withdrawal of the tail therefrom. The tail is wrapped around the windshield wiper, passed through the head portion and clipped off to permanently secure the dispenser to the wiper.

In another embodiment the fastening means comprises a section of tubing of resilient material which is split lengthwise along one side and secured to the capsule so that the tubing section can be opened along the split to grip the windshield wiper.

These and other features, objects and advantages of the invention will be more fully understood from the following more detailed description, taken in connection with the accompanying drawings.

BRIEF DESCRIPTION OF THE DRAWINGS:

FIG. 1 is a perspective view showing in broken lines a portion of a vehicle with the dispenser according to the invention secured to a windsheidl wiper thereon.

FIG. 2 is a partially exploded isometric view showing the cylindrical bar of cleaning substance ready for insertion, and the closure cap which retains it in position within the capsule.

FIG. 3 is a top view of the device shown in FIGS. 1 and 2, with dotted lines indicating certain internal details.

FIG. 4 is an elevational view of the metal clip portion of the device.

FIG. 5 is a partially sectional view taken along line 5—5 of FIG. 3, with the metal tabs shown bent around a portion of the windshield wiper when installed as in FIG. 1.

DESCRIPTION OF THE PREFERRED EMBODIMENTS

Figure 6:
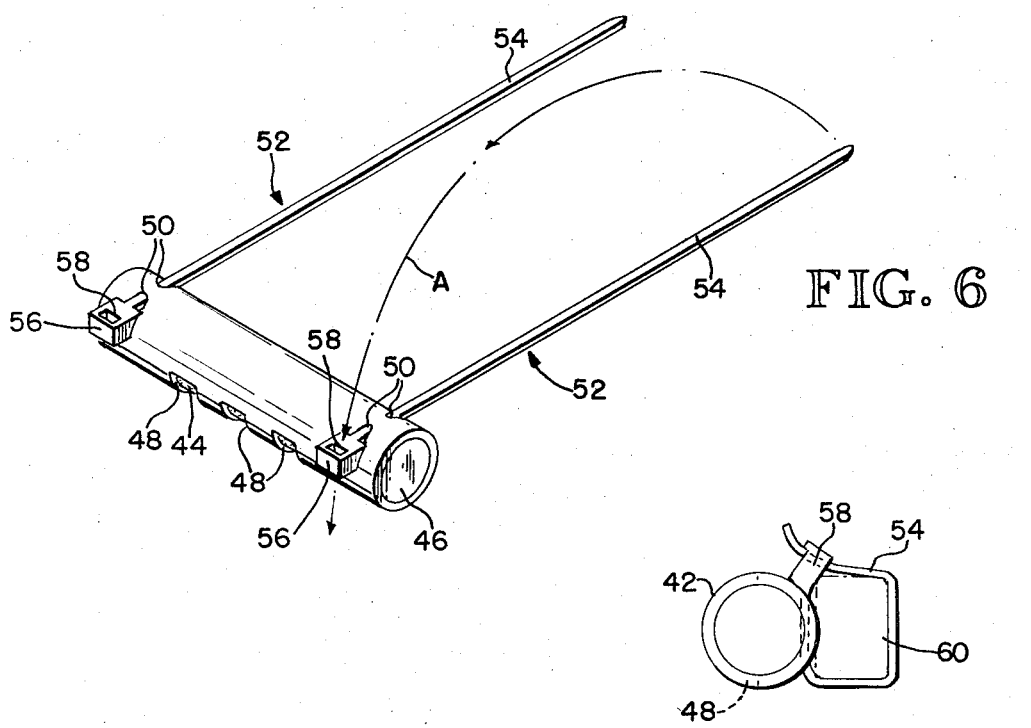
FIG. 6 is an isometric view of a second embodiment of the invention having a different form of capsule and different fastening means.

The dispenser 10 in accordance with invention is designed to be fastened to the arm of windshield wiper 12 to dispense a cleaning substance held therein onto the windshield 14 of vehicle 16. The embodiment illustrated first consists of a metal clip portion 18 for securing the device to the windshield wiper arm, and a plastic capsule portion 20 having an internal cavity 22 for receiving a cylindrical bar of solid cleaning substance 24 held within the cavity by a cap 26.

Elongated slots 28 and 30 permit entry of water into the cavity to dissolve portions of the cleaning substance 24 and permit exit of dissolved cleaning substance drop-by-drop onto the windshield 14.

The metal clip portion 18 consists of an elongated base portion 32 and a plurality of bendable tabs 34 extending laterally therefrom. The tabs 34 are bent around a windshield wiper arm 36 as in FIG. 5 to mount the dispenser as in FIG. 1. The plastic capsule portion 20 is secured to the metal clip portion 18 in this embodiment by the injection of the plastic during manufacture through holes 38 in the base portion 32 of the clip to form rivet-like nubs 40 on the back side of the clip as shown in FIGS. 3 and 5.

Figure 7:
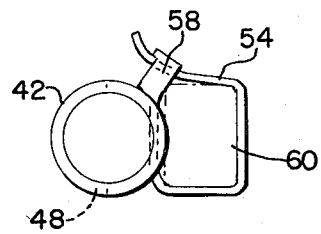
FIG. 7 is an end view of the device shown in FIG. 6, shown installed on a windshield wiper member.

A second embodiment of the dispenser is shown in FIGS. 6 and 7. In this case the capsule portion 42 is a simple cylindrical tube with the cleaning substance 44 inserted and an end cap 46 secured in each end to retain the substance within the tube. Three slots 48 cut across one side of the tube permit entry of water and exit of dissolved cleaning substance. On the back side of the tube 42 a hole 50 is provided near each end, through which in each case is passed a fastener 52.

Flexible plastic or rubber fasteners 52 are known to the art. Referred to as "mouse tails," they are used by electricians to tie together bundles of wires. Each includes an elongated flexible tail portion 54 and a head portion 56 having a hole 58 through which the tail portion 54 is inserted as indicated by the arrow A. The construction of the head 56 or a detent element therein (not shown) prevents withdrawal of the tail once inserted. Hence to mount the dispenser on a windshield wiper arm 60 as shown in FIG. 7 the tail portion 54 of each fastening member is passed around the arm 60, through its own head portion 58, and is pulled tight and clipped off.

Figure 8:
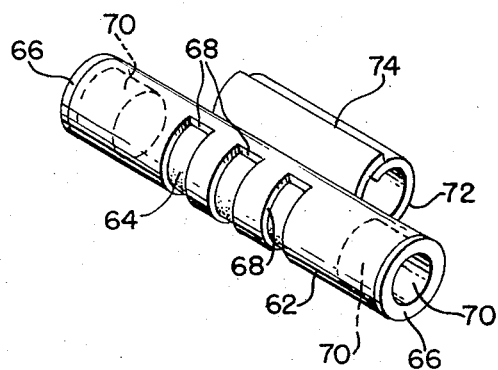
FIG. 8 is an isometric view of a third embodiment of the invention showing a different fastening means.
Figure 10:
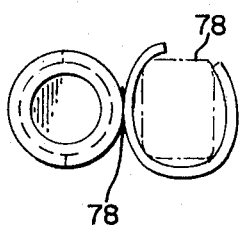

A third embodiment of the invention is illustrated in FIGS. 8 and 10 wherein the cylindrical capsule 62 again contains a bar of cleaning substance 64 within its cylindrical cavity, and three slots 68 cut across the center of the tube for entry of water and exit of dissolved cleaning substance. The end caps 66 in this embodiment are hat shaped, including an annular flange visible at each end and a cylindrical portion 70 extending into the tube to compress the cleaning substance therein when inserted.

Figure 9:
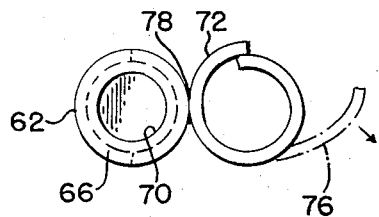
FIGS. 9 and 10 are end views of the embodiment of FIG. 8 illustrating the functioning of the resilient fastening means for installing the device on a windshield wiper member.

The means for fastening this dispenser to the windshield wiper arm consists of a shorter section of flexible plastic tube 72 which is split lengthwise along a split line 74. It can be opened as shown by the dotted line portion 76 of FIG. 9 to receive and grip the windshield wiper arm 78 as shown in FIG. 10. The tube section 72 is simply glued to the plastic capsule 62 along the reentrant spaces 78. Both the fastening means 72 and the capsule 62 are made from the same type of resilient plastic tubing to reduce manufacturing costs.

The replaceable bar of cleaning substance is eventually used up, of course, and must be replaced. An end cap can be removed in any of the three embodiments and a new bar inserted. The cleaner is specially made for effectively performing the functions required by the invention, namely to dissolve slowly, to redry without becoming powdery and crumbling, and to clean road surface oils and other common substances from the windshield.

While various cleaning fluids have been devised and offered for use in cleaning windshields in the past, the concept of this invention involves the use of a cleaning substance which is retainable in a container exposed to the weather and especially adapted when wet to flow slowly onto the windshield, yet recover from the presence of water and retain its condition of readiness for use thereafter. Preferably the substance is in solid form and adapted to dissolve on the surface and flow a few drops at a time from the dispenser, without becoming completely dissolved and running out too fast. The substance must be capable of redrying and resuming its solid form after water is no longer present, without wastage of previously partly dissolved surface portions thereof. Upon redrying the substance must not crumble or flake off and drop out of the slots in the dispenser.

The invention resides in the combination of a cleaning substance having these qualities with a dispenser as described, as well as in the features of the dispenser itself, all as defined in the appended claims.

I claim:

1. A windshield cleaning substance dispenser comprising a tubular capsule having an internal cavity for holding a body of cleaning substance therein and having openings for entry and exit of moisture; and fastening means including a section of resilient plastic tubing secured externally along the capsule and parallel thereto and split lengthwise to be opened along the split, the resilience thereof normally holding the edges along the slit in contact with one another, to resiliently grip and secure the capsule to the windshield wiper of the vehicle.

2. The dispenser of claim 1 including a solid bar of cleaning substance adapted to fit within said cavity and comprising a material the surface of which dissolves partially when wetted by moisture entering the openings so that small amounts thereof run out of the capsule and in the absence of water the dissolved surface portions redry into their former solid condition.

* * * * *